Patented Jan. 15, 1946

2,393,109

UNITED STATES PATENT OFFICE 2,393,109

PROCESS FOR THE PREPARATION OF VITAMINS OF THE TYPE $B_1$

Rezső König, Árpád Gerecs, and Zoltán Földi, Budapest, Hungary; vested in the Alien Property Custodian No Drawing. Application April 28, 1941, Serial No. 390,742. In Hungary May 27, 1940

4 Claims. (Cl. 260—251)

The present invention relates to a new useful process for the preparation of vitamin $B_1$ and of similarly formed compounds. This process consists in subjecting 2-methyl-2,3-dihalogen-tetrahydrofuranes to the action of reagents usually used for splitting off halogen acids and in subjecting the product, thus obtained, i. e. the unsaturated 2-methyl-3-halogen-dihydrofurane to the action of 2-alkyl-4-amino-5-(thioformamidoalkyl)-pyrimidine.

An advantageous form of this process consists in subjecting 2-methyl-2,3-dichloro-tetrahydrofurane to the action of reagents generally used for splitting off hydrochloric acid and in subjecting the product, thus obtained, i. e. the unsaturated 2-methyl-3-chloro-dihydrofurane to the action of 2-methyl-4-amino-5-(thioformamido-methyl)-pyrimidine.

The unsaturated 2-methyl-3-halogen-dihydrofurane, which are intermediary products in the present process, have the following formula:

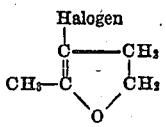

in which the two vicinals of the three freed valences form a double bond while the third free valence is saturated with hydrogen, to the action of 2-methyl-4-amino-5-(thioformamido-methyl)-pyrimidine.

These products can be obtained, as already mentioned, by splitting off halogen acid from the 2-methyl-2,3-dihalogen-tetrahydrofurane, such as 2-methyl-2,3-dichloro-tetrahydrofurane, or directly from aceto-chloro-propyl alcohol as well by the action of phosphorous halides, such as phosphorous oxychloride, or phosphorous trichloride and by treating the reaction mixture with agents, such as pyridine, capable of splitting off halogen acid.

The preparation of 2-methyl-2,3-dihalogen-compounds is described in details in our co-pending patent application Ser. No. 390,124, filed April 24, 1941, patented August 22, 1944, No. 2,356,594. Therefore, we describe in the following the preparation of the starting materials only in brief outlines. So for example 50 g. of aceto-chloro-propyl alcohol or its ether described by Stevens and Stein (Journ. Amer. Chem. Soc., 1940, page 1046), which boils in vacuo of 1 mm. Hg pressure at 111–112° C,. are saturated under cooling in a freezing mixture with hydrogen chloride gas, then anhydrous sodium sulphate is added to the reaction mixture, the oil is decanted and distilled in a vacuo of 2 mm. Hg. At about 45° about 50 g. of 2-methyl-2,3-dichloro-tetrahydrofurane distills. Out of this product the unsaturated 2-methyl-3-chlor-dihydrofurane can be obtained in the following manner:

The 15 g. of 2-methyl-2,3-dichloro-tetrahydrofurane the calculated amount of dry pyridine is added, whereupon a white crystalline mass of salt is formed, which is heated for about ½ hour (at a temperature between about 110–130° C.) Two layers separate. After cooling the upper layer is decanted, or separated in another way. The oil is distilled at a pressure of 50 mm. Hg. At about 50° 7–8 g. of the unsaturated 2-methyl-3-chloro-dihydrofurane are obtained.

The splitting off of the halogen acid can also be preferably effected by salts of organic acids:

15.5 g. of 2-methyl-2,3-dichloro-tetrahydrofurane and 14.4 g. of dry sodium benzoate are mixed. A development of heat can be observed. The mixture is stirred while cooling. When the sodium benzoate has gone into solution the mixture is kept for an hour in a water bath of about 60° C. Then the reaction mixture is distilled at a pressure of about 50 mm. Hg in an oil bath. The distillate is kept in a freezing mixture. During the distillation the temperature of the oil bath is slowly elevated until 120° C. is reached. The distillate weighs about 10.2 g. and distills at about 40 mm. Hg pressure at about 49–50° C. The chlorine content of the product is 29.8%.

The unsaturated furane derivative can also be prepared from dihalogen furane derivatives, obtained in another way. For instance one may transform acetochloro-propyl alcohol with thionylchloride into 2,3-dichloro-furane derivative and split off from this hydrogen chloride. But one may also proceed by mixing, under cooling, 3 mol. of aceto-chloro-propyl alcohol with from 1 to 1.5 mol. of phosphorous oxychloride or phosphorous trichloride (preferably in chloroform as medium), then by adding a quantity of pyridine equivalent to the chlorine content of the phosphorous chloride and by heating the reaction mixture the chloroform is distilled off and the unsaturated 2-methyl-3-chloro-dihydrofurane is separated from the residue either directly by distillation or by extracting with a solvent.

Details of the preparation of vitamin $B_1$ or of similarly formed compounds can be found in the following:

10 g. of 2-methyl-4-amino-5-(thioformamido-methyl)-pyrimidine, 14 g. of the unsaturated 2-methyl-3-chloro-dihydrofurane and 10 ccm. formic acid of about 91% are heated for 40 hours at 50° in an incubator. Then 100 ccm. of absolute alcohol and 10 ccm. of absolute alcohol containing 30% of hydrogen chloride gas are added to the light brown reaction mixture. After standing for some hours 9 or 10 g. of vitamin $B_1$ crystallize in form of white crystalline powder. It melts at about 243–245°. Its content of chlorine is 20%.

One proceeds in the same manner when starting from the corresponding bromo-dihydrofurane compound condensing this with 2-methyl-4-amino-5-(thioformamidomethyl)-pyrimidine or by starting from the chloro-di-hydrofurane compound condensing this with 2-methyl-4-amino-5-(thioformamido-ethyl)-pyrimidine.

What we claim is:

1. A process for the preparation of vitamin $B_1$, which consists in heating a compound of the formula

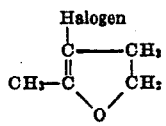

with 2 - methyl - 4 - amino - 5 - (thioformamidomethyl)-pyrimidine.

2. A process as claimed in claim 1, wherein a compound of the said graphic formula is heated with 2 - methyl - 4 - amino - 5 - (thioformamidomethyl)-pyrimidine and subsequently allowed to stand with absolute alcohol containing hydrogen chloride to give a crystalline product.

3. A process for preparing vitamin $B_1$, which consists in heating the 2-methyl-3-chloro-dihydrofurane having a double bond between the methyl and chlorine substituted carbon atoms of the empirical formula $C_5H_7OCl$ with 2-methyl-4-amino-5-(thioformamido-methyl)-pyrimidine.

4. A process for the preparation of vitamin $B_1$, according to claim 3, in which the action of the 2 - methyl - 3 - chloro-dihydrofurane on 2-methyl-4-amino - 5 - (thioformamidomethyl)-pyrimidine is effected in formic acid as a medium.

REZSŐ KÖNIG.
ÁRPÁD GERECS.
ZOLTÁN FÖLDI.